2,719,173
Patented Sept. 27, 1955

2,719,173
ALUMINUM CHLORIDE CATALYZED REACTION OF CHLORETONE WITH SUBSTITUTED BENZENES

Donald G. Kundiger, Manhattan, Kans., and Huey Pledger, Jr., Pittsburgh, Pa., assignors to The Dow Chemical Company, Midland, Mich., a corporation of Delaware No Drawing. Application June 18, 1952,
Serial No. 294,264

11 Claims. (Cl. 260—539)

This invention is concerned with a method of preparing useful compounds from chloretone and is particularly directed to a method for preparing 3-aryl-1,1-dichloro-2-methylpropenes. It is further concerned with a chloretone-toluene reaction product.

According to the present invention, it has been found that 1,1,1 - trichloro - 2 - methyl - 2 - propanol, commonly known as chloretone, may be reacted with benzenoid compounds of the formula

wherein each R represents bromine, chlorine, a lower alkyl radical, a lower alkoxy radical or hydrogen, in the presence of aluminum chloride as catalyst, and at 60° to 150° C., to obtain as a major product of reaction a substituted 2-methyl-propene-1 compound of the formula

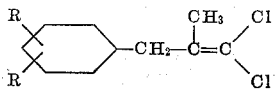

wherein each R has the significance as set forth above. These compounds are useful for the control of insect pests. Further, it has been found that significant yields of α-chloroisobutyric acid are produced in the reaction.

In the reaction, it is convenient to employ the chloretone as chloretone hemihydrate. The latter compound is commercially available, and has the advantage of being relatively stable upon exposure to air. The aluminum chloride is employed in the anhydrous form.

In the practice of the invention the chloretone and substituted benzene reactants may be mixed together and heated at temperatures of from 60° to 150° C. with the aluminum chloride being added portionwise and intermittently with stirring during the heating operation. Alternatively, the chloretone and benzene compound may be mixed together and added portionwise to the aluminum chloride contained in, or simultaneously fed into the reaction vessel with suitable agitation of the reaction mixture during the addition, the reaction vessel and contents being maintained at a temperature within the range set forth above. In the above alternative procedures, agitation is continued and temperature maintained within the indicated range for such period as may be required to accomplish the desired reaction.

The described operations are preferably carried out in a reaction vessel having an inner surface relatively resistant to attack by the hydrogen chloride developed as a product of reaction. Suitable reactor surfaces include those of glass, nickel, stainless steel, porcelain and the like. The exact equipment employed is not critical and may range from an open pot reactor with adequate facilities for the recovery of hydrogen chloride to a system run on a continuous or semi-continuous basis with any excess of either organic reactant being recovered and recycled in the system.

The reaction proceeds satisfactorily under atmospheric pressure, although pressures somewhat elevated or reduced from atmospheric may be employed if desired.

The proportions of the reactants are not critical. However, good yields of the 2-methylpropene-1 compounds are obtained when employing at least one mole of the benzene compound for each mole of chloretone. In a preferred embodiment of the invention, a considerable molecular excess of the benzene compound is used, the excess then serving as a reaction solvent. Any suitable proportion of aluminum chloride may be used provided that sufficient is introduced into the reaction zone to initiate and maintain the reaction. This proportion may be described as a catalytic amount. Good results have been obtained when employing less than an equimolecular proportion and preferably from about 0.25 to 0.75 mole of anhydrous aluminum chloride per mole of chloretone.

In general, the reaction is initiated promptly and proceeds rapidly when the reactants and catalyst are brought together at a temperature within the range indicated. The reaction is exothermic, and the rate increases with increasing temperature. Excessive temperatures are to be avoided in order to minimize the production of tarry by-products. While the temperature range of 60° to 150° C. is operable, a preferred range is from 80° to 125° C. The reaction temperature, rate and required time of reaction may in part be determined by the rate of addition of the catalyst. In laboratory operations, good yields have been obtained when allowing a reaction time of about one hour per mole of chloretone employed.

The products of the reaction may be separated by conventional procedures. In one method of operation, the reaction product is added to a mixture of crushed ice and a strong mineral acid to decompose the aluminum chloride catalyst, the resulting mixture separating into an aqueous layer and an oily organic layer. The organic layer is then separated and the aqueous layer extracted with ether. The organic layer and ether extracts are combined and the ether is recovered by distillation. The products of the reaction are then separated and unreacted starting materials recovered by fractional distillation under vacuum.

A preferred embodiment of the present invention consists of the described reaction as carried out with a mono-substituted benzene compound of the formula

wherein R represets chlorine, bromine, lower alkyl or lower alkoxy. The expressions "lower alkyl" and "lower alkoxy" as herein employed refer to radicals containing from 1 to 4 carbon atoms, inclusive.

The following examples illustrate the invention but are not to be construed as limiting the same.

Example 1

888 grams (4.75 moles) of chloretone hemihydrate and 1015 grams (9 moles) of chlorobenzene were mixed together in a glass-lined reactor and heated under atmospheric pressure to a temperature of about 100° C. 238.5 grams (1.8 moles) of anhydrous aluminum chloride was added to the above mixture portionwise with stirring over a period of 2 hours and 35 minutes, the reaction mixture being maintained at a temperature of 99° to 103° C. Hydrogen chloride gas was evolved and recovered by absorption in water. Upon completion of the addition of aluminum chloride, heating to 100° C. and stirring were continued for about one hour, and the mixture thereafter allowed to stand undisturbed at room temperature for 16 hours. The resulting crude product was added gradually with stirring to a mixture of 1500 grams of crushed ice and 150 milliliters of concentrated hydrochloric acid. Stirring was discontinued and the mixture separated into a water immiscible brown organic oily layer and an aqueous layer. Ether was added to facilitate layering and the organic and aqueous layers were separated, the aqueous layer being extracted with further portions of ether, and the extract combined with the organic oil layer. The combined ether extract and oil layer were dried over anhydrous magnesium sulphate, filtered and the ether recovered by distillation. The residual product was fractionally distilled under vacuum to obtain 227.8 grams of a 3-(4-chlorophenyl)-1,1-dichloro-2-methylpropene-1 product boiling at 88° to 95° C. at 0.5 to 0.8 millimeters pressure. This product had a refractive index ($n$/D) of 1.5577 at 20° C., a density (20°/4°) of 1.283 and analyzed 44.47 percent by weight of chlorine, 50.85 percent carbon and 3.89 percent hydrogen as compared to theoretical values of 45.2, 50.99 and 3.85, respectively, for the desired compound.

In addition to the above product, a yield of 119.2 grams of α-chloroisobutyric acid was obtained in the fractionation.

*Example 2*

178 grams (0.95 mole) of chloretone hemihydrate and 284 grams (1.8 mole) of bromobenzene were mixed together in a glass flask and heated under atmospheric pressure to a temperature of 100° C. 48 grams (0.36 mole) of anhydrous aluminum chloride was added portionwise (with stirring to the above mixture over a period of 3 hours. The reaction was completed and the product worked up and fractionated as in the preceding example to obtain a 3-(4-bromophenyl)-1,1-dichloro-2-methylpropene-1 product, boiling at 109° to 111° C. at 0.9 to 1.2 millimeters pressure. This product had a refractive index ($n$/D) at 20° C. of 1.5747, a density (20°/4°) of 1.508 and an analysis as set forth in the following table.

| Percent by Weight of— | Observed | Theoretical |
|---|---|---|
| Bromine | 28.45 | 28.54 |
| Carbon | 42.57 | 42.89 |
| Hydrogen | 3.30 | 3.24 |
| Chlorine | 25.4 | 25.3 |

In addition to the above product, 30.08 grams of α-chloroisobutyric acid was obtained.

*Example 3*

53.6 grams (0.4 mole) of anhydrous aluminum chloride was placed in a glass lined reaction vessel and heated under atmospheric pressure to a temperature of about 73° C. 177.5 grams (0.95 mole) of chloretone hemihydrate was dissolved in 259 grams (3.3 moles) of benzene, and this solution added dropwise with stirring to the reaction vessel over a period of 3.5 hours, the temperature being maintained at 72° to 73° C. Hydrogen chloride gas was evolved and recovered as in Example 1. Upon completion of the addition of the reactants, heating at 72° C. with stirring was continued for 0.5 hour and the reaction mixture then allowed to stand undisturbed for 16 hours at room temperature. The crude reaction mixture was then poured onto a mixture of 500 grams crushed ice and 60 milliliters of concentrated hydrochloric acid, and the product extracted and worked up as in the previous examples. The fraction, boiling at 56° to 60° C. under a pressure of 0.3 to 0.5 millimeters, was separated. This fraction consists of a mixture of α-chloroisobutyric acid and 3-phenyl-1,1-dichloro-2-methylpropene-1.

*Example 4*

166.5 grams (1.8 mole) of toluene and 177.5 grams (0.95 mole) of chloretone hemihydrate were mixed together and 48 grams (0.36 mole) of anhydrous aluminum chloride added portionwise thereto over a period of two hours. During the above addition, the reaction mixture was stirred continuously and maintained under atmospheric pressure at a temperature of about 100° C. Upon completion of the addition of the aluminum chloride, heating at 100° C. was continued for one hour with stirring and the reaction mixture then allowed to stand at room temperature for 16 hours. The product was worked up as in the preceding examples to separate a 3-tolyl-1,1-dichloro-2-methylpropene-1 product boiling at 65° to 70° C. under 0.2 to 0.3 millimeter pressure. This product consisted of a mixture of the ortho- and para-tolyl dichloromethylpropene derivatives. In addition to the above product, 20.6 grams of α-chloroisobutyric acid was obtained as a low-boiling by-product.

*Example 5*

Following the procedure of Example 2, 177.5 grams (0.95 mole) of chloretone hemihydrate, 235 grams (2.2 moles) of anisole, and 66.3 grams (0.5 mole) of anhydrous aluminum chloride were reacted together at a temperature of 85° to 90° C. The crude reaction product was worked up and separated as previously described to obtain a 3-(4-methoxyphenyl)-1,1-dichloro-2-methylpropene-1 product boiling at 110° to 114° C. under 1.1 millimeters pressure. This product was characterized by a refractive index ($n$/D) of 1.5505 at 20° C., a density (20°/4°) of 1.211 and an analysis as set forth in the following table.

| Percent by Weight of— | Observed | Theoretical |
|---|---|---|
| Chlorine | 30.7 | 30.68 |
| Carbon | 57.1 | 57.16 |
| Hydrogen | 5.26 | 5.23 |

In a similar fashion, chloretone may be reacted in the presence of aluminum chloride with phenetole, propoxybenzene, ethyl-benzene, para-cymene, secondarybutylbenzene, ortho-dichlorobenzene, para-chlorotoluene and similar benzenoid compounds.

Certain of the products described herein are claimed as new compounds in our copending application, Serial No. 294,265, filed concurrently herewith.

We claim:

1. A method for the preparation of a 3-aryl-1,1-dichloro-2-methylpropene-1 of the formula

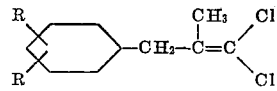

wherein each R is selected from the group consisting of chlorine, bromine, lower alkyl radicals, lower alkoxy radicals and hydrogen, which comprises the step of reacting (1) chloretone with (2) a benzenoid compound of the formula

wherein each R has the significance as set forth above, in the presence of a catalytic amount of anhydrous aluminum chloride and at a temperature of from about 60° to 150° C.

2. A method for the preparation of a 3-aryl-1,1-dichloro-2-methylpropene-1 of the formula

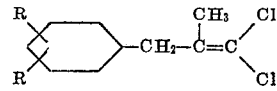

wherein each R is selected from the group consisting of bromine, chlorine, lower alkyl radicals, lower alkoxy radicals and hydrogen, which comprises the step of reacting (1) chloretone with (2) a benzenoid compound of the formula

wherein each R has the significance as set forth above, in the presence of a catalytic amount of anhydrous aluminum chloride and at a temperature of from 80° to 125° C.

3. A method for the preparation of a 3-aryl-1,1-dichloro-2-methylpropene-1 of the formula

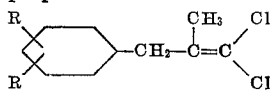

wherein each R is selected from the group consisting of chlorine, bromine, lower alkyl radicals, lower alkoxy radicals and hydrogen, which comprises the step of reacting one molecular proportion of chloretone with at least one molecular proportion of a benzenoid compound of the formula

wherein each R has the significance as set forth above, in the presene of a catalytic amount of anhydrous aluminum chloride and at a temperature of from about 60° to about 150° C.

4. A method for the preparation of a 3-aryl-1,1-dichloro-2-methylpropene-1 of the formula

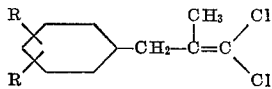

wherein each R is selected from the group consisting of chlorine, bromine, lower alkyl radicals, lower alkoxy radicals and hydrogen, which comprises the steps of reacting (1) chloretone with (2) a benzenoid compound of the formula

wherein each R has the significance as set forth above, in the presence of anhydrous aluminum chloride, said aluminum chloride being employed in the proportion of 0.25 to 0.75 mole per mole of chloretone in the reaction mixture, and at a temperature of from about 60° to 150° C.

5. A method for the preparation of a 3-aryl-1,1-dichloro-2-methylpropene-1 of the formula

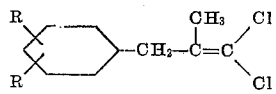

wherein each R is selected from the group consisting of chlorine, bromine, lower alkyl radicals, lower alkoxy radicals and hydrogen, which comprises the step of reacting one molecular proportion of chloretone with at least one molecular proportion of a benzenoid compound of the formula

wherein each R has the significance as set forth above, in the presence of anhydrous aluminum chloride, said aluminum chloride being employed in the proportions of 0.25 to 0.75 mole per mole of chloretone in the reaction mixture, and at a temperature of from about 60° to 150° C.

6. A method for the preparation of a 3-aryl-1,1-dichloro-2-methylpropene-1 of the formula

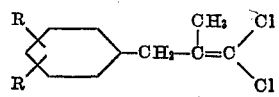

wherein each R is selected from the group consisting of chlorine, bromine, lower alkyl radicals, lower alkoxy radicals and hydrogen, which comprises the steps of reacting one molecular proportion of chloretone with at least one molecular proportion of a benzenoid compound of the formula

wherein each R has the significance as set forth above at a temperature of from 60° to 150° C., in the presence of anhydrous aluminum chloride, said aluminum chloride being employed in the proportions of 0.25 to 0.75 mole per mole of chloretone in the reaction mixture and thereafter separating α-chloroisobutyric acid and the desired 3-aryl-1,1-dichloro-2-methylpropene-1.

7. A method for the preparation of a 3-aryl-1,1-dichloro-2-methylpropene-1 of the formula

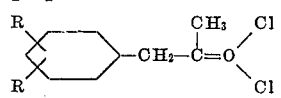

wherein each R is selected from the group consisting of chlorine, bromine, lower alkyl radicals, lower alkoxy radicals and hydrogen, which comprises the steps of reacting one molecular proportion of chloretone with at least one molecular proportion of a benzenoid compound of the formula

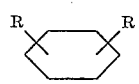

wherein each R has the significance as set forth above at a temperature of from about .60° to 150° C., in the presence of anhydrous aluminum chloride, said aluminum chloride being employed in the proportions of 0.25 to 0.75 mole per mole of chloretone in the reaction mixture, decomposing the aluminum chloride with water and a strong mineral acid and separating α-chloroisobutyric acid and the desired 3-aryl-1,1,-dichloro-2-methylpropene-1 by fractional distillation of the crude reaction product under reduced pressure.

8. A method for the preparation of 3-(4-chlorophenyl)-1,1-dichloro-2-methylpropene-1 which comprises the step of reacting chloretone with chlorobenzene in the presence of a catalytic amount of anhydrous aluminum chloride at a temperature of from about 60° to 150° C.

9. A method for the preparation of 3-(4-bromophenyl)-1,1-dichloro-2-methylpropene-1 which comprises the step of reacting chloretone with bromobenzene in the presence of a catalytic amount of anhydrous aluminum chloride at a temperature of from about 60° to 150° C.

10. A method for the preparation of 3-(4-methoxyphenyl)-1,1-dichloro-2-methylpropene-1 which comprises the step of reacting chloretone with anisole in the presence of a catalytic amount of anhydrous aluminum chloride at a temperature of from about 60° to 150° C.

11. A method for the preparation of a 3-tolyl-1,1-dichloro-2-methylpropene-1 which comprises the step of reacting chloretone with toluene in the presence of a catalytic amount of anhydrous aluminum chloride at a temperature of from about 60° to 150° C.

References Cited in the file of this patent

UNITED STATES PATENTS 2,485,017    Schmerling _____ Oct. 18, 1949

OTHER REFERENCES

Bachman et al.: J. Amer. Chem. Soc., vol. 70, pp. 1772–4 (1948).